US006881775B2

(12) United States Patent
Ddamulira et al.

(10) Patent No.: US 6,881,775 B2

(45) Date of Patent: Apr. 19, 2005

(54) LOW EMISSIONS ONE PART ADHESIVE

(75) Inventors: Robert Kintu Ddamulira, Chattanooga, TN (US); John Edmund Raidy, Jr., Pasadena, CA (US); Barry Kenneth Wright, Rosewell, GA (US); Darwin Carles Regis, Lakewood, CA (US)

(73) Assignee: W.F. Taylor Co., Inc., Fontana, CA (US)

( * ) Notice: Subject to any disclaimer, the term of this patent is extended or adjusted under 35 U.S.C. 154(b) by 0 days.

(21) Appl. No.: 10/749,683

(22) Filed: Dec. 30, 2003

(65) Prior Publication Data

US 2004/0162369 A1 Aug. 19, 2004

Related U.S. Application Data

(63) Continuation of application No. 10/126,146, filed on Apr. 19, 2002, now Pat. No. 6,706,789.

(60) Provisional application No. 60/284,954, filed on Apr. 19, 2001.

(51) Int. Cl.[7] .................................................. C08K 5/16

(52) U.S. Cl. ....................... 524/186; 524/413; 524/428; 524/275; 524/270; 524/602; 156/60

(58) Field of Search ................................ 524/186, 413, 524/428, 275, 270, 602; 156/60

(56) References Cited

U.S. PATENT DOCUMENTS 4,562,225 A * 12/1985 Huber et al. ................ 524/602

4,626,575 A * 12/1986 Goel 5,322,909 A 6/1994 Rankl et al.

6,706,789 B1 * 3/2004 Ddamulira et al. ......... 524/186

FOREIGN PATENT DOCUMENTS

EP 0385747 * 9/1990

EP 0534322 * 3/1993

OTHER PUBLICATIONS

European Search Report, dated Dec. 10, 2004, for Application EP 02 73 4005.

* cited by examiner

*Primary Examiner*—William K. Cheung

(74) *Attorney, Agent, or Firm*—Stroock & Stroock & Lavan LLP

(57) ABSTRACT

An adhesive composition which can be formulated to have low or substantially no VOC emissions is provided. Adhesives in accordance with the invention can be formulated as high solids, one-part, reactive, cross-linked adhesives. This can be achieved by utilizing amide-ester-acrylate reactions or reactions with any other carboxylated polymers. Adhesive compositions in accordance with the invention can include oils, such as various drying oils and similarly acting polymers, co-polymers, and fatty acids. Adhesives in accordance with the invention can also include various hydrocarbon resins, particularly crosslinkable hydrocarbons having a melting point in the range 70° C. to 140° C. Cross-linking agents, such as materials with pendant oxazoline groups are also advantageously included. Various other mixing, flow and other handling ingredients can also be included.

34 Claims, 2 Drawing Sheets

LOW EMISSIONS ONE PART ADHESIVE

CROSS REFERENCE TO RELATED APPLICATIONS

This application is a continuation of co-pending application No. 10/126,146, filed Apr. 19, 2002, now U.S. Pat. No. 6,706,789, which claims priority to Provisional Application No. 60/284,954 filed Apr. 19, 2001.

FIELD OF THE INVENTION

The invention is directed to a low emissions one part adhesives and methods of making the same.

BACKGROUND OF INVENTION

The invention relates generally to adhesives, such as flooring adhesives, and more particularly, to adhesives that have low emissions of undesirable materials, such as volatile organic compounds (VOCs).

Many products are assembled using adhesives. For example, various flooring products made from wood, vinyl, tile, carpet and so forth are permanently adhered to a surface or substrate through the use of an adhesive. Commonly used adhesives include those sold under the trademarks Taylor Enviotec 2090 Vinyl Adhesive and Taylor Envirotec 2055 Premium Carpet Adhesive sold, by W.F. Taylor Co. of Fontana, Calif.

There are at least two general types of adhesives: two component adhesives and one component adhesives. Two components reactive adhesives are generally formed with a resin component and a hardener component and the resin and hardener are mixed immediately prior to application. This causes a chemical reaction to occur which typically initiates some type of cross-linking process. Two component adhesives are often considered undesirable because considerable mixing of the components must occur just prior to use. This can be inconvenient. Also, just the right amount of adhesive must be mixed prior to application. If too much is mixed, or the working "pot" time is exceeded, the adhesive will harden and the excess must be discarded. Reactive urethane type adhesives contain materials such as isocyanates, which are often considered undesirable.

Single component adhesives can be more convenient to use than two component adhesives. Many single component adhesives are solvent-based adhesives in which an adhesive composition is mixed with a solvent and packaged in a drum, can or tube. After the adhesive is applied to a substrate, the solvent evaporates, which causes the adhesive to cure.

The solvents used in certain conventional solvent-based adhesives are believed by some to be undesirable. For example, many solvent-based adhesives emit VOCs. Depending on the working environment, available ventilation, and the amount of adhesive to be used, some consider the VOC's and other emitted chemicals to be disadvantageous. Other single component adhesives contain excessive amounts of water, which can damage wood surfaces. There are other single component reactive adhesives such as moisture cure urethanes, but they typically exhibit emission problems because they give off solvents and other potentially dangerous materials such as isocyantes (MDI and TDI).

Accordingly, it is desirable to provide an improved adhesive which overcomes drawbacks and inadequacies of conventional adhesives.

SUMMARY OF THE INVENTION

Generally speaking, in accordance with the invention, a one component high strength adhesive composition which can be formulated to have low or substantially no VOC emissions is provided. Adhesives in accordance with the invention can be formulated as high solids, one-part, reactive, cross-linked adhesives. This can be achieved by utilizing amide-ester-acrylate reactions or reactions with any other carboxylated polymers. Adhesive compositions in accordance with the invention can include oils, such as various drying oils and similarly acting polymers, co-polymers, and fatty acids. Metal naphthanates can be used to catalyze the drying speed when the adhesive composition is applied to a substrate.

Adhesives in accordance with the invention can also include various hydrocarbon resins, particularly crosslinkable hydrocarbons having a melting point in the range 70° C. to 140° C. These can be dissolved or otherwise mixed in the drying oil component. For example, C-5 hydrocarbon resins formed from hydrocarbons having an average of about five carbon atoms and C-9 hydrocarbon resins formed of hydrocarbons having an average of about 9 carbon atoms and preferably both, mixed in effective proportions to provide desired cured strength, green strength, open working times and so forth can be satisfactory.

Adhesives in accordance with the invention can also include fugitive alkali agents, such as ammonia, monomethanol amine (MEA) and triethanol amine (TEA). Cross linking agents, such as materials with pendant oxazoline groups, such as latex polymer solutions and emulsions which include those groups are also advantageously included. Various other mixing, flow and other handling ingredients can also be included.

High solids construction adhesives in accordance with the invention can be particularly useful in assembling various flooring products made from wood, vinyl, ceramic, rubber to various substrates common to flooring installations including: concrete, plywood, underlayment grade particle board, vinyl, ceramic tile, cement patches and underlayments, radiant heat flooring and terrazzo. Adhesives in accordance with the invention can benefit from polymer emulsions with carboxyl functionality, polymer emulsion cross-linkers containing pendant oxazoline group are also advantageously employed. Other useful ingredients include tackifying hydrocarbon resins dissolved in drying oils; napthanates of metals such as cobalt, calcium, zirconium, and manganese; fugitive bases for pH adjustment; and other stabilizing agents, such as fugitive anti-oxidants.

Accordingly, it is an object of the invention to provide an improved adhesive.

Another object of the invention is to provide an improved method of making an adhesive.

Still other objects of the invention will in part be obvious and will, in part, be apparent from the specification. The invention accordingly comprises the composition of matter, the method of making a composition of matter and the method of using the composition of matter which will be exemplified in the compositions and methods hereinafter described, and the scope of the invention will be indicated in the claims.

BRIEF DESCRIPTION OF THE DRAWINGS

In the drawing figures, which are merely illustrative.

DETAILED DESCRIPTION OF THE PREFERRED EMBODIMENTS

Figure 1:
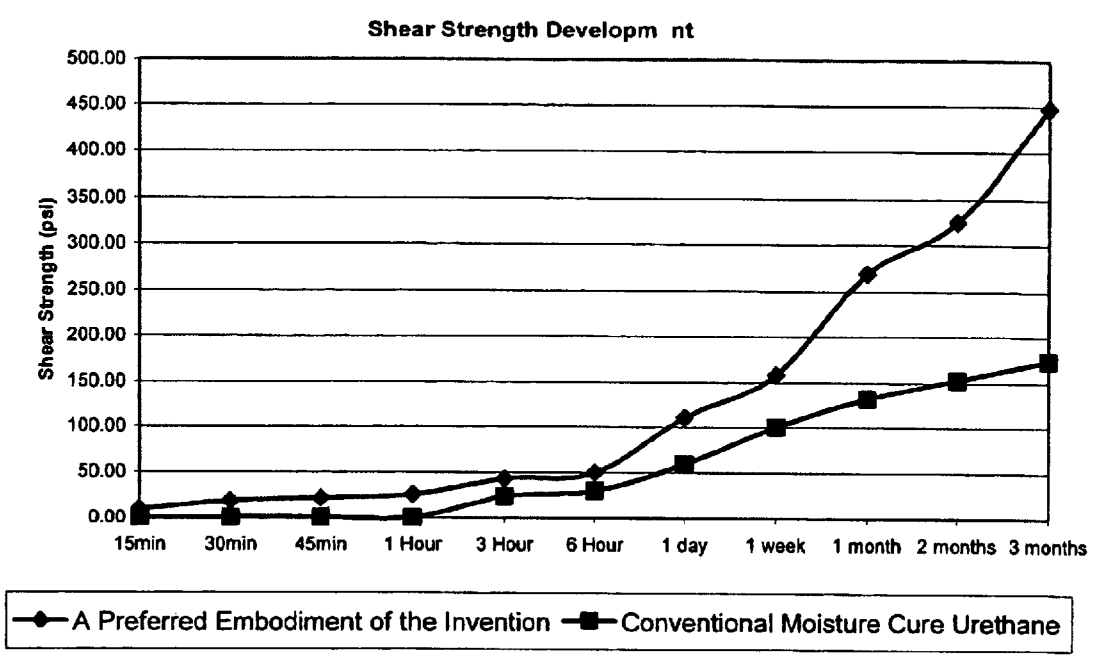
FIG. 1 is a graph depicting shear strength development over three months aging, comparing the performance of a preferred embodiment of the invention with a leading moisture cure urethane adhesive on the market. As demonstrated in FIG. 1, an adhesive in accordance with the preferred embodiments of the invention is immediately stronger than a leading moisture cure urethane adhesive, cures to have higher shear strength and does not give off unacceptable VOCs while curing.

The invention is directed to adhesive compositions and methods of making adhesive compositions which can include ingredients set forth below. The invention also relates to methods of applying flooring involving the use of those adhesives. As will be evident to those of ordinary skill in the art, substitutions, omissions and additions will be possible in order to provide adhesives with customized selected properties.

Preferred ingredients, preferred percentages of components and mixing processes in accordance with preferred embodiments of the invention will be set forth below in Table 1.

TABLE 1

| | Preferred Ingredient | Preferred Amount wt % | Preferred Process |
|---|---|---|---|
| 1 | Drying Oils such as Linseed Oil, Tung Oil, Sunflower Oil, Cashew Shell Oil, Castor Oil, Coconut Oil, Cotton Seed Oil, Fish Oil, Oiticica Oil, Rapeseed Oil, Safflower Oil, Sesame Oil, Soybean Oil, Walnut Oil, Synthetic Drying Oils, Tall Oil, Fatty Acids, or any blend of the above. | 4 to 10 | |
| 2 | Aliphatic C-5 Hydrocarbon Resin with a softening point of between about 75° and 115° C., such as that produced from Acyclic Aliphatic monomers such as Cis 1, 3 Pentadiene, Trans 1, 3 Pentadiene, 2-Methyl 2 Butene, Dicyclopentadiene Copolymers, Vinyltoluene Copolymers | 4 to 10 | |
| 3 | Alkylated Aromatic C-9 Resin with a softening point of between about 100° and 140° C., produced from C-8 to C-10 monomers such as Styrene, Vinyl Toluene, Indene, Methyl Indene, Alpha Methyl Styrene. | 10 to 20 | Ingredient 2 and 3 are combined with Ingredient 1. Temperatures of between about 240° and 300° F. may be required to form a substantially homogenous solution. This homogenous solution should be held at between about 250° and 260° before being combined with the ingredients below. |
| 4 | Surfactants, such as 6 to 10 mole ethoxylates of nonylphenols and other emulsifying agents such as saponified esters. | 0.50 to 1.50 | Add ingredients 4 and 5 to ingredient 6 while mixing until uniform. |
| 5 | Anti-foaming agents such as non-silicon anti-foaming agents | 0.05 to 0.10 | |
| 6 | Polymer emulsions or hot melt polymers (advantageously high solids) with carboxyl functionality, such as Acrylic, Styrene Butadiene, EVA, VAE | 30 to 60 | Maintain the temperature of ingredient 6 to between 60° and 90° F. Add ingredients 4 and 5 while mixing until uniform. Then add the premixed ingredients 1, 2 and 3 above to ingredient 6 with high shear agitation until ingredients form a homogenous emulsion. |
| 7 | Fugitive anti-oxidants such as oximes such as methyl ethyl ketoxime, Bactericide, Fungicides, and Freeze-Thaw Stabilizers | 0.10 to 1.00 | Add while agitating |
| 8 | Fugitive alkali agent, such as Ammonia, MEA, TEA | 0.10 to 1.00 | Use the alkali to adjust the above emulsion pH to between 8–10 before adding ingredients 9 and 10 |
| 9 | Dispersing Agent, such as salts of poly acrylic acid | 0.10 to 1.00 | Add while agitating |
| 10 | Napthanates of metals such as cobalt, calcium, zirconium, and manganese | 0.10 to 1.00 | Add while agitating |

TABLE 1-continued

| | Preferred Ingredient | Preferred Amount wt % | Preferred Process |
|---|---|---|---|
| 11 | Polymer emulsion with pendant oxazaoline groups | 1.00 to 7.00 | Add while agitating |
| 12 | Fillers such as Calcium Carbonate, Kaolin Clay, Mica, Talc, Silica, etc. | 20 to 40 | Add slowly with high shear agitation |

Adhesive compositions in accordance with the invention advantageously include liquids that can be used to dissolve and blend other ingredients, but which can be easily and readily oxidized and/or polymerized to transform into a hard, dry material after exposure to air. Examples of such material include relatively highly unsaturated oils and polymers, such as those identified above as drying oils. The drying oil component can be included as about 1 to 20%, preferably 4 to 10%, more preferably about 2% to 5%. By dissolving (mixing) the resins in the drying oil component and the addition of fugitive anti-oxidants, the resins can be prevented from cross-linking until the drying oil is exposed to air and hardens. The cross-linking starts as the composition starts to dry and the fugitive anti-oxidant starts to evaporate. Thus, there should be sufficient anti-oxidant to prevent the composition from curing too quickly, and to provide sufficient open time and ease of handling. Preferred open time should be up to about 30 and sometimes up to about 60 minutes and depend on the desired application.

Adhesives in accordance with the invention can also include hydrocarbon resins. The resins are selected to give the cured adhesive the desired amount of cured strength. Appropriate selection of resins also affects the uncured strength (initial shear strength) of the adhesive, often referred to as green strength. For example, if the adhesive is used as a flooring adhesive, it is desirable that the uncured adhesive maintain the applied flooring in place with reasonable security so that tiles, for example, can be aligned properly and so that minor bumps and nudges do not require reseating and realignment of the flooring materials. Below is a comparison of typical green strength in psi, of adhesives in accordance with a preferred embodiment of the invention compared to a leading VOC emitting Moisture Cure Urethane Adhesive currently on the market:

refer to the temperature at which viscous flow of a material that does not have a definite melting point changes to plastic flow.

Resins in accordance with preferred embodiments of the invention generally have softening points between 75° C. and 140° C. It has also been determined that by mixing resins with different softening points, advantageous characteristics of each resin can be realized. For example, resins with a relatively low softening point, e.g., about 95–105° C. will have up to 30–40% less green strength and cured strength than resins with a relatively high softening point in the range of e.g., 115–130° C. Softening point also affects processing and handling properties. If a softening point is too high, desired materials might be difficult to emulsify at temperatures needed for proper mixing.

In one embodiment of the invention, a resin formed with hydrocarbons having, on average, 6 or fewer carbon atoms and a softening point preferably between 75° C. and 115° C. is combined with a relatively harder resin formed from hydrocarbons having an average of 7 or more carbon atoms and a softening point preferably about between 100° C. and 140° C.

In preferred embodiments of the invention, the relatively soft resin is an aliphatic hydrocarbon resin formed of hydrocarbons having an average of about 5 carbon atoms. Advantageous resins can be formed from acyclic aliphatic monomers, such as cis 1,3 pentadiene, trans 1,3 pentadiene, and 2-methyl 2 butene and cyclopentadienes.

Adhesive compositions in accordance with the invention also advantageously include a relatively harder hydrocarbon resin, particularly one having a higher temperature softening point in the range of 100° C. to 140° C. In particular, alkylated aromatic resins, particularly those formed from hydrocarbons having an average of 8 to 10 carbon atoms,

| | Cure Time | | | | | | | | | | | |
|---|---|---|---|---|---|---|---|---|---|---|---|---|
| | 15 Min | 30 Min | 45 Min | 60 Min | 3 Hour | 6 Hour | 16 Hour | 24 Hour | 1 week | 1 month | 2 months | 3 months |
| Invention Adhesive | 5 | 22 | 23 | 32 | 45 | 50 | 86 | 94 | 158 | 269 | 325 | 448 |
| Moisture Cure Urethane | 1 | 1 | 1 | 1 | 7 | 28 | 53 | 57 | 100 | 132 | 153 | 174 |

Conventional moisture Cure Urethane adhesives can contains up to 1% 4,4'-Diphenylmethane Diisocyanate (MDI), up to 1% Toluene Diisocyante, up to 10% Aliphatic Petroleum Distillates, up to 1% Ethyl Benzene, Up to 5% Xylene, Up to 7% Mineral Spirits and up to 1.5% 1,2,4-Trimethyl Benzene. All these VOCs are listed in the hazardous materials section of the MSDS for most commercial grade moisture cure urethane adhesives.

It has been determined that the cured strength and green strength of the adhesive can be related to the softening points of the resin material. As used herein, softening point will such as those produced from C-8, C-9 and C-10 monomers, such as styrene, vinyl toluene, indene, methyl indene, alpha methyl styrene. Particularly suitable C-9 resins include petroleum aromatic hydrocarbon resins having softening points in the range 100° C. to 135° C. These relatively harder resins are advantageously included as 10 to 20%, preferably 12% to 18%. Other non-limiting examples of suitable C-9 and C-5 Resins are described below in Table 2. Adhesives in accordance with the invention can also be formulated with Versadil 100, Versadil 101 and Versadil 200.

TABLE 2

| Manufacturer | C-9 Resins | C-5 Resins |
|---|---|---|
| Rutgers VFT AG<br>Varziner Strasse 49, D-47138<br>Duisburg Germany | Novares TT120<br>Novares TT130 | |
| Sartomer Company<br>Oaklands Corporate Center<br>502 Thomas Jones Way<br>Exton, PA 19341 | Norsolene S115,<br>Norsolene S125,<br>Norsolene S135 | |
| Exxon Chemicals<br>Houston<br>2401 S. Gessner<br>Houston, TX 77063-2005, USA | | Escorez 1102<br>Escorez 1304<br>Escorez 1310LC<br>Escorez 1315<br>Escorez 1580 |
| Neville Chemical Company<br>2800 Neville Road<br>Pittsburgh, PA 15225 | Nevchem 110<br>Nevchem 120<br>Nevchem 130<br>Nevex 100 | Lx-1200<br>Lx-1200-130<br>Lx-2600-125 |
| Eastman Chemical Company<br>P.O.Box 431 Kingsport, TN 37662 | Petrorez 100<br>Petrorez 199<br>Petrorez 200 | |
| Resinall<br>3065 High Ridge Road<br>P.O. Box 8149<br>Stamford CT 06903 | Resinall 711<br>Resinall 717<br>Resinall 736<br>Resinall 737<br>Resinall 747<br>Resinall 771<br>Resinall 774 | Resinall 769 |
| TOSOH Corporation<br>Suite 600, 1100 Circle<br>75 Parkway, Atlanta, GA<br>30339-3097,<br>U.S.A. | Petcoal ® 100<br>Petcoal ® 120<br>Petcoal ® 120HV<br>Petcoal ® 140 | |
| Arakawa CHEMICAL (USA) INC.<br>625 N. Michigan Avenue - Suite #1700<br>Chicago, IL 60611 USA | Arkon SM-10<br>Arkon SP10 | |
| Grenhall Chemicals Limited<br>7686 Bath Road,<br>Mississauga, ON Canada L4T 1L2 | Resin GC100,<br>Resin GC300,<br>Resin GC400 | |
| Hercules Inc.<br>Resins Division<br>Hercules Plaza<br>1313 North Market Street<br>Wilmington, DE 19894 | Picco 5120<br>Picco 6115 | Piccotac 115<br>Piccotac B |
| Yuen Liang Industrial Co., Ltd<br>South Korea | Petroresin (yl-series, sk-series, gs-series b-series with softening point of between 90–130° C. | |
| Sunbelt Chemicals, Inc.<br>407 N. Cedar Ridge, Suite 230<br>Duncanville, Texas 75116 | SB1000<br>SB1100<br>SB140ES | R100AS<br>S105A<br>R100G |
| LUKOIL Bulgaria<br>Bulgaira<br>1421 Sofia,<br>59 A Cherni Vrah Blvd | PYROLEN 100 | |

When preparing adhesive compositions in accordance with the invention, the low softening point resins (with 6 or fewer carbon atoms) are advantageously provided in the drying oil component in about a 2:1 to 1:2, preferably 1:1 weight ratio. The mixture of ingredients 1 and 2 of Table 1 can then be advantageously heated to a temperature above the softening point of the high temperature resin, preferably in the range of 115° C. to 140° C. with mixing, to form a generally homogeneous combination. Care should be taken to insure that the composition is not heated to a temperature too far over the softening points of the materials or it can be difficult to blend with the rest of the ingredients. Thus, after a homogeneous combination is achieved, the temperature can be reduced to a point when ease of mixing is maintained, generally approximately 115° C. to 130° C.

Surfactants, such as 6 to 10 mole ethoxylates of nonylphenols can be included, advantageously in the range of less than 5% by weight, advantageously 0.5 to 1.5%.

It is also advantageous to include anti-foaming agents, in particular, non-silicon anti-foaming agents. These are advantageously included as less than about 0.5 weight percent, preferably 0.05 to 0.10 weight percent.

Adhesives in accordance with the invention also advantageously include polymer emulsion materials, particularly those having carboxyl functionality to provide enhanced adhesive properties, such as those having acrylic, styrene butadiene, ethylene vinyl acetate copolymer (EVA) and vinyl acetate ethylene copolymer can be included as about 20 to 80%, preferably about 30 to 60%, more preferably about 35 to 55% of the composition. The emulsion should be maintained at a temperature of about 15 to 30° C. Ingredients 4 and 5 can then be added and mixed until uniform. Ingredients 1, 2 and 3 are then added with high shear agitation until the ingredients form a substantially homogeneous blend.

Compositions in accordance with the invention also advantageously include fugitive anti-oxidants, such as oximes, such as methyl ethyl ketoxime, bactericides, fungicides and freeze/thaws stabilizers.

Compositions in accordance with the invention also advantageously include fugitive alkali agents, such as ammonia, monomethanol amine (MEA) and triethanolamine (TEA). This alkali agent can be useful to adjust the pH of the emulsion to at least 7, preferably between about 8 and 10 before the oxazoline containing component is added.

Adhesive compositions in accordance with the invention can also include up to 2%, preferably 2.1 to 1% dispersing agents, such as salts of polyacrylic acids and dryers, in particular naphthanates of metals, such as cobalt, calcium, zirconium and manganese. The dryers should be included in an effective amount to catalyze the drying speed of the drying oil to a desired rate. The precise amount will depend on both the desired speed of cure and the particular composition of the adhesive. These should be added with agitation.

Adhesive compositions in accordance with the invention also advantageously include oxazole containing materials, in particular, polymer emulsion materials that include pendant oxazoline groups. There should preferably be about a 1:1 mole ratio between carboxly groups in the composition and oxazoline groups. If too much of these materials are added, it will lower the possible solids content. If too little is added there will be lower cross link density and a weaker adhesive.

Oxazolines are 5-membered heterocyclic compounds, having the general formula $C_3H_3NO$ and are frequently used in organic synthesis. Emulsions containing particles of an oxazoline-modified polymer containing pendant oxazoline groups are discussed in U.S. Pat. Nos. 4,474,923, 4,508,869 and 4,325,856, the contents of which are incorporated herein by reference. Preferred oxazolines have the following formula:

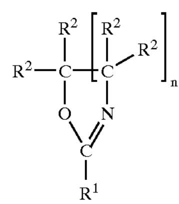

wherein $R^1$ is an acyclic or organic radical having addition polymerizable unsaturation; each $R^2$ is independently hydrogen, halogen or an inertly substituted, organic radical and n is 1 or 2. The oxazoline containing emulsion preferably also includes at least one other addition polymerizable monomer which is copolymerizable with the oxazoline and discrete particles of a coreactive polymer which coreactive polymer had been prepared in an emulsion polymerization process from (1) an addition, polymerizable coreactive monomer containing pendant groups which are capable of reacting with an oxazoline group to form covalent bonds thereto and (2) at least one other monomer which is copolymerizable with said coreactive monomer.

Adhesive compositions in accordance with the invention can also include effective amounts of fillers, such as calcium carbonate, kaolin clay, mica powder, talc and so forth. Fillers should generally represent less than 50% of the composition, preferable in the range of 20–40% of the composition. If too much filler is included the cohesive strength of the product can be reduced. If too little filler is included, the solids content will be too low for many applications.

These components should be added slowly, with high shear agitation, to ensure a substantially homogeneous mixture.

After adhesive compositions in accordance with the invention are deposited, the polymer emulsion containing the oxazoline groups is believed to become available to act as a cross-linking agent to cure the carboxylated polymers. Accordingly, a one component self-curing adhesive which can be made substantially or entirely free of VOC's can be achieved.

In another non-limiting embodiment of the invention, the process by which the adhesive in accordance with the invention is made can be split into two stages. The first stage can comprise the blending of the first seven ingredients and storing, with constant slow agitation, the resulting mixture as a premix to be used the final blend. The second stage comprises blending the last five ingredients with the premix.

Prior to blending the premix with the remaining ingredients, the premix may be cooled to a temperature preferable in the range of 75° F. to 110° C. The cooling may occur using such devices as: a cooling jacket with cold water, a cooling jacket with a cooling tower, heat exchanger, a flash vacuum cooling system, or any other cooling device that can lower the temperature to within the desired range. Heat exchangers such as shell and tube heat exchangers, spiral heat exchangers, plate and frame heat exchangers, or compabloc welded plate heat exchangers may be used.

After blending the premix with the remaining ingredients and prior to packaging the composition, the final temperature of the batch should be cooled to a temperature of preferably not more than 90° F.

Areas designed to house electrical equipment or various manufacturing or testing procedures often need to avoid the build-up of static electricity. In another non-limiting embodiment of the invention, adhesives in accordance with the invention can be rendered electrically conductive. Conductive adhesive are advantageously used in constructing Electrostatic Dissipative Floors (ESD) by the inclusion of electro-conductive agents in the adhesive composition. Particularly suitable electro-conductive agents include carbon black, synthetic conductive fibers, electrically conductive metal chips or fragments, or any other conductive materials such as conductive nano materials.

Table 3, below provides formulation information for preparing electrically conductive adhesives in accordance with the invention. Table 3 also shows an alternative manufacturing process, which can also be used with the non-conductive adhesive. Other processing steps can be substituted such as those in Table 1.

TABLE 3

Conductive Adhesive

| | Preferred Ingredients | Preferred Amount wt % | Preferred Process |
|---|---|---|---|
| 1 | Drying Oil such as Linseed oil, Tung Oil, Sunflower Oil, Cashew Shell Oil, Castor Oil, Coconut Oil, Cotton Seed Oil, Fatty Acids, Fish Oil, Oiticica Oil, Rapeseed Oil, Safflower Oil, Sesame Oil, Soybean Oil, Walnut Oil, Synthetic Drying Oils, Tall Oil, Fatty Acids, | 4 to 10 | |
| 2 | Aliphatic C-5 Hydrocarbon Resin with a softening point of between 75° and 115° C., such as those produced from Acyclic Aliphatic monomers such as Cis 1,3 Pentadiene, Trans 1,3 Pentadiene, 2-Methyl 2 Butene, Dicyclopentadiene Copolymers, Vinyltoluene Copolymers, | 4 to 10 | |
| 3 | Alkylated Aromatic C-9 Resin with a softening point of between about 100° and 140° C., produced from C8 to C-10 monomers such as Styrene, Vinyl Toluene, Indene, Methyl Indene, Alpha Methyl Styrene. | 10 to 20 | Ingredient 2 and 3 are dissolved in ingredients 1 at temperatures of between 240° and 300° F. to form a homogenous solution. This homogenous solution should be held at between 250° and 260° F. before being added to ingredients below. |
| 4 | Surfactants, such as 6 to 10 mole ethoxylates of nonylphenols. | 0.50 to 1.50 | Ingredients 1 through 5 should be premixed and then heated and maintained at temperature between about 240° and 260° F. |
| 5 | Anti-foaming agents, such as Non-Silicon Anti-foaming agents | 0.05 to 0.10 | |
| 6 | Polymer emulsion, advantageously with high solids content, e.g. Latex Polymer with Carboxyl Functionality, such as Acrylic, Styrene Butadiene, EVA, VAE. | 30 to 60 | Pre-heat and maintain the temperature of ingredient 6 to between 60° and 100° F. Add the premixed ingredients above to ingredient 6 with high shear agitation until ingredients form a homogenous emulsion. |
| 7 | Fugitive anti-oxidants, Bactericide, Fungicides, and Freeze-Thaw Stabilizers | 0.10 to 1.00 | Add while agitating |
| Stage one is the blending of the first 7 ingredients and storing preferably (with constant slow agitation). The resulting mixture is used as a premix to be used in the final blend. Prior to blending the premix above with the rest of the ingredients below, the premix should be coded. | | | |
| 8 | Dispersing Agent, such as salts of poly acrylic acid. | 0.10 to 1.00 | Add while agitating |
| 9 | Electro-conductive agents such as; Carbon black, Synthetic Conductive Fibers, Electrically Conductive metal chips or fragments, or any other conductive materials such as Conductive Nano Materials | 5.0 to 15.0 | Add while agitating |
| 10 | Napthanates of metals such as cobalt, calcium, zirconium, and manganese | 0.10 to 1.00 | Add while agitating |
| 11 | Fugitive alkali agent, such as Ammonia, MEA, TEA | 0.10 to 1.00 | Use the alkali to adjust the above emulsion pH to between 8–10 before adding ingredients 9 and 10 |
| 12 | Fillers such as Calcium carbonate, Kaolin Clay, Mica, Talc etc | 20 to 40 | Add slowly with high shear agitation |
| 13 | Latex polymer emulsion with pendant oxazoline groups | 1.00 to 7.00 | Add while agitating |
| The final temperature of the batch should be cooled to a temperature of not more than 90° F., prior to packaging. | | | |

The following examples are provided for purposes of illustration only and should not be construed as limiting the scope of the invention.

TABLE 4

| | Shear Strength Data (psi) at various Cure Times | | | | | | | |
|---|---|---|---|---|---|---|---|---|
| | 15 Min | 30 Min | 45 Min | 1 Hour | 3 Hour | 6 Hour | 16 Hour | 24 Hour |
| Example 1 | 4.3 | 11.6 | 26.2 | 29.8 | 45.3 | 50.3 | 86.6 | 94.0 |
| Example 2 | 4.1 | 20.7 | 23.3 | 29.4 | 38.9 | 43.2 | 81.5 | 89.1 |
| Example 3 | 4.9 | 21.7 | 23.3 | 31.5 | 45.3 | 50.3 | 85.7 | 94.0 |
| Conventional Moisture Cure Urethane | 1 | 1 | 1 | 1 | 7 | 28 | 53 | 57 |

As shown in Table 4, the adhesive of Examples 1–3, set forth below, exhibited excellent green strength and cure strength compared to conventional adhesives such as moisture cure urethane and exhibited acceptably low VOC emissions while curing.

Table 5, below, provides non-limiting examples of application examples. As shown, adhesive in accordance with the invention can be used to apply a wide variety of flooring. Acceptable coverage depends on the underlying floor substrate and the backing of the flooring to be applied. However, coverage in the range of about 20 to 300 $ft^2$/gallon can be acceptable, preferably about 20–150 $ft^2$/gallon for wood; 100–300 $ft^2$/gallon for vinyl or ceramic and 50–150 $ft^2$/gallon for carpet. The adhesive can be applied using any suitable dispensing method such as trowelling, spray pumping, extrusion and so forth.

TABLE 5

| Application Devices and Application Rates | | |
|---|---|---|
| Installation Application | Trowel Size (width × depth × spacing) | Coverage (square feet per gallon) |
| Carpet or Wood | 3/32" × 3/32" × 3/32" v notch | 100–120 |
| Carpet | 1/8" × 1/8" × 1/16" v notch | 75–108 |
| Carpet | 1/8" × 1/8" × 1/16" u notch | 36–63 |
| Vinyl | 1/16" × 1/16" × 1/16" sq. notch | 150–180 |
| Vinyl | 1/16" × 1/32" × 1/32" u notch | 180–250 |
| Wood | 1/8" × 1/8" × 1/8" sq. notch | 60–80 |
| Wood | 3/16" × 3/16" × 3/16" sq. notch | 30–40 |
| Wood | 3/16" × 1/4" × 1/2" V notch | 50–60 |

EXAMPLE 1—CONSTRUCTION ADHESIVE

| | Ingredient | Amount wt % | Process |
|---|---|---|---|
| 1 | Linseed Oil | 6.00 | |
| 2 | Aliphatic C-5 Hydrocarbon Resin with a softening point of 85° C. | 6.00 | |
| 3 | Alkylated Aromatic C-9 Resin with a softening point of 115° C. | 14.25 | Ingredient 2 and 3 are dissolved in ingredients 1 at temperatures of between 240° and 300° F. to form a homogenous solution. This homogenous solution should be held at between 250° and 260° F. before being added to ingredients below. |
| 4 | 9 mole ethoxylates of nonylphenols surfactant | 1.00 | Add ingredients 4 and 5 to ingredient 6 while mixing until uniform. |
| 5 | Non-Silicon Anti-foaming agent | 0.25 | |
| 6 | Carboxylated High Solids Acrylic | 43.00 | Maintain the temperature of ingredient 6 to between 60° and 90° F. Add ingredients 4 and 5 while mixing until uniform. Then add the premixed ingredients 1, 2, and 3 above to ingredient 6 with high shear agitation until ingredients form a homogenous emu |
| 7 | Fugitive anti-oxidant, and Freeze-Thaw Stabilizer | 0.05 | Add while agitating |
| 7 | Bactericide, and Fungicides | 0.05 | Add while agitating |

-continued

| | Ingredient | Amount wt % | Process |
|---|---|---|---|
| 8 | Ammonia | 0.50 | Use the alkali to adjust the above emulsion pH to between 8–10 before adding ingredients 9 and 10 |
| 9 | Dispersing Agent, such as salts of poly acrylic acid. | 0.20 | Add while agitating |
| 10 | Cobalt, Managanese, and Manganese Napthanates | 0.20 | Add while agitating |
| 11 | Polymer emulsion with pendant oxazoline groups | 1.50 | Add while agitating |
| 12 | Calcium Carbonate | 27.00 | Add slowly with high shear agitation |

EXAMPLE 2 FOR CONSTRUCTION ADHESIVE

| | Ingredient | Amount wt % | Process |
|---|---|---|---|
| 1 | Tung Oil | 6.00 | |
| 2 | Aliphatic C-5 Hydrocarbon Resin with a softening point of 85° C. | 6.00 | |
| 3 | Alkylated Aromatic C-9 Resin with a softening point of 115° C. | 14.25 | Ingredient 2 and 3 are dissolved in ingredients 1 at temperatures of between 240° and 300° F. to form a homogenous solution. This homogenous solution should be held at between 250° and 260° F. before being added to ingredients below. |
| 4 | 9 mole ethoxylates of nonylphenols surfactant | 1.00 | Add ingredients 4 and 5 to ingredient 6 while mixing until uniform. |
| 5 | Non-Silicon Anti-foaming agent | 0.25 | |
| 6 | Carboxylated High Solids Styrene Butadiene Rubber | 43.00 | Maintain the temperature of ingredient 6 to between 60° and 90° F. Add ingredients 4 and 5 while mixing until uniform. Then add the premixed ingredients 1, 2, and 3 above to ingredient 6 with high shear agitation until ingredients form a homogenous emu |
| 7 | Fugitive anti-oxidant, and Freeze-Thaw Stabilizer | 0.05 | Add while agitating |
| 7 | Bactericide, and Fungicides | 0.05 | Add while agitating |
| 8 | Ammonia | 0.50 | Use the alkali to adjust the above emulsion pH to between 8–10 before adding ingredients 9 and 10 |
| 9 | Dispersing Agent, such as salts of poly acrylic acid. | 0.20 | Add while agitating |
| 10 | Cobalt, Managanese, and Manganese Napthanates | 0.20 | Add while agitating |
| 11 | Polymer emulsion with pendant oxazoline groups | 1.50 | Add while agitating |
| 12 | Calcium Carbonate | 27.00 | Add slowly with high shear agitation |

EXAMPLE 3—CONSTRUCTION ADHESIVE

| | Ingredient | Amount wt % | Process |
|---|---|---|---|
| 1 | Sunflower Oil | 6.00 | |
| 2 | Aliphatic C-5 Hydrocarbon Resin with a softening point of 85° C. | 6.00 | |
| 3 | Alkylated Aromatic C-9 Resin with a softening point of 115° C. | 14.25 | Ingredient 2 and 3 are dissolved in ingredients 1 at temperatures of between 240° and 300° F. to form a homogenous solution. This homogenous solution should be held at between 250° and 260° F. before being added to ingredients below. |
| 4 | 9 mole ethoxylates of nonylphenols surfactant | 1.00 | Add ingredients 4 and 5 to ingredient 6 while mixing until uniform. |
| 5 | Non-Silicon Anti-foaming agent | 0.25 | |
| 6 | Carboxylated High Solids Styrene Butadiene Rubber | 43.00 | Maintain the temperature of ingredient 6 to between 60° and 90° F. Add ingredients 4 and 5 while mixing until uniform. Then add the premixed ingredients 1, 2, and 3 above to ingredient 6 with high shear agitation until ingredients form a homogenous emu |
| 7 | Fugitive anti-oxidant, and Freeze-Thaw Stabilizer | 0.05 | Add while agitating |
| 8 | Bactericide, and Fungicides | 0.05 | Add while agitating |
| 9 | Ammonia | 0.50 | Use the alkali to adjust the above emulsion pH to between 8–10 before adding ingredients 9 and 10 |
| 10 | Dispersing Agent, such as salts of poly acrylic acid. | 0.20 | Add while agitating |
| 11 | Cobalt, Managanese, and Manganese Napthanates | 0.20 | Add while agitating |
| 12 | Polymer emulsion with pendant oxazoline groups | 1.50 | Add while agitating |
| 13 | Kaolin Clay | 7.00 | Add slowly with high shear agitation |
| 14 | Calcium Carbonate | 20.00 | Add slowly with high shear agitation |

Table 6 below provides Moisture Transmission Data (per ASTM 96–00) of adhesive in accordance with a preferred embodiment of the invention versus leading Moisture Cure Urethane Wood Adhesive which emit undesirable VOCs.

TABLE 6

| Adhesive | ASTM 96-00 Moisture Transmission, G/m2(24 hr-mm Hg) |
|---|---|
| A preferred embodiment of the invention | 0.59. |
| Commercial Moisture Cure Urethane Wood Adhesive 1 | 1.20. |
| Commercial Moisture Cure Urethane Wood Adhesive 2 | 0.60. |

Low moisture transmission permits an adhesive to act as a moisture barrier. Table 6 shows that adhesives in accordance with the invention can be formulated to have at least as good moisture barrier properties as conventional urethane adhesives, but without the same level of VOC emissions.

FIG. 1 shows that in certain respects, adhesives in accordance with the invention can have enhanced adhesive properties compared with conventional urethane adhesives. Adhesives in accordance with the invention can be formulated to have a shear strength of over 5 psi, even over 10 psi at 15 minutes, and over 10 psi, even over 20 psi at 30 min. Final cure strengths (at 3 months) can exceed 200 psi, and can even exceed 300 psi or 400 psi. The adhesive used for FIG. 1 exhibited a shear strength of 450 psi. In addition to exhibiting advantageous green strengths, adhesives in accordance with the invention also exhibit desirable open times. Even at open times of up to 60 minutes the adhesive will still exhibit advantageous strength characteristics.

Figure 2:
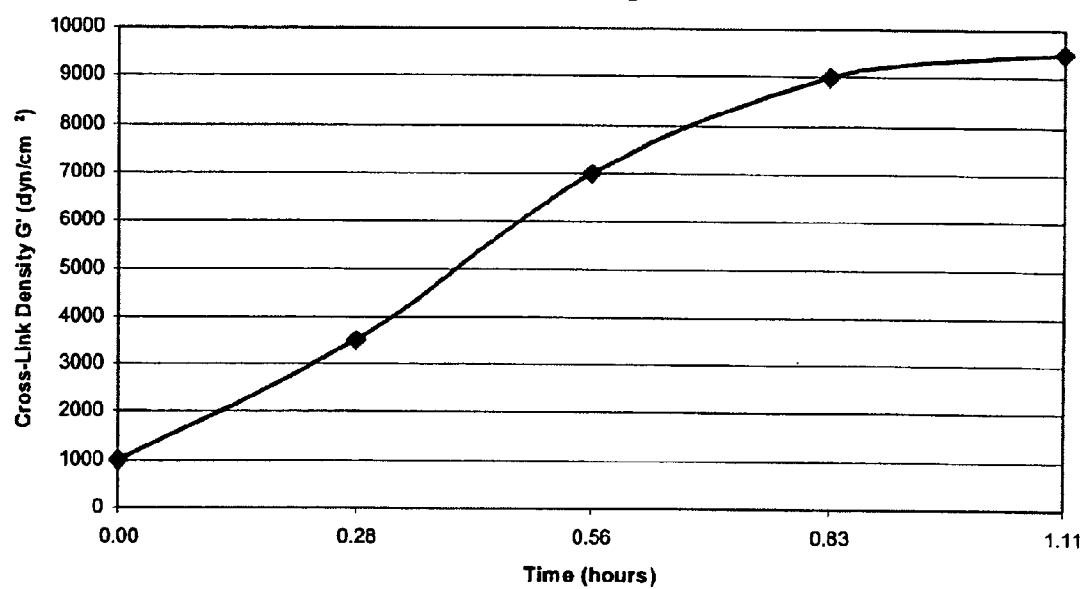
FIG. 2 is a graph showing increase in cross link density of an adhesive formulated in accordance with a preferred embodiment of the invention, with progressing time.

FIG. 2 shows the progression of cross-link density with time for one embodiment of the invention. Adhesives in accordance with the invention can be formulated to exhibit an immediate initiation of cross-linking and a steady progression for the first hour. Different embodiments of the invention can be formulated to exhibit faster or slower progressions, varying by e.g.—about 10 or 20%, or otherwise depending on the desired applications.

It will thus be seen that the objects set forth above, among those made apparent from the preceding description, are efficiently attained, and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An adhesive composition comprising: the combination produced by combining effective amounts and proportions of an oil component; a hydrocarbon resin component; a fugitive alkali agent component; a fugitive anti-oxidant component; and a cross linking agent component, to provide an adhesive that can be applied to a substrate and which will cure on the substrate.

2. The adhesive composition of claim 1, wherein the resin component comprises a C-5 hydrocarbon component and a C-9 hydrocarbon component.

3. The adhesive composition of claim 1, wherein the hydrocarbon resin component comprises a hydrocarbon resin having a softening point from about 70° C. to 140° C.

4. The adhesive composition of claim 1, wherein the oil component comprises at least one member selected from the group consisting of linseed oil, tung oil and sunflower oil.

5. The adhesive composition of claim 1, wherein the oil component comprises at least one member selected from the group consisting of cashew shell oil, castor oil, coconut oil, cotton seed oil, fish oil, oiticica oil, rapeseed oil, safflower oil, sesame oil, soybean oil, walnut oil, tall oil, and fatty acids.

6. The adhesive composition of claim 2, wherein the C-5 hydrocarbon has a softening point from between 75° C. to 115° C.

7. The adhesive composition of claim 2, wherein the C-5 hydrocarbon is selected from the group consisting of cis 1,3 pentadiene, trans 1,3 pentadiene, and 2-methyl 2 butene.

8. The adhesive composition of claim 2, wherein the C-9 hydrocarbon has a softening point from between 100° C. to 140° C.

9. The adhesive composition of claim 2, wherein the C-9 hydrocarbon is selected from the group consisting of styrene, vinyl toluene, indene, methyl indene, and alpha methyl styrene.

10. The adhesive composition of claim 1, wherein the fugitive alkali agent comprises a member selected from the group consisting of ammonia, monoethanol amine, and triethanol amine.

11. The adhesive composition of claim 1, wherein the fugitive anti-oxidant component comprises an oxime.

12. The adhesive composition of claim 1, wherein the cross linking agent component comprises latex polymer emulsions.

13. The adhesive composition of claim 1, and comprising a metal napthanate.

14. The adhesive of claim 1, and comprising a polymer emulsion component with carboxyl functionality.

15. The adhesive of claim 14, wherein the polymer emulsion component comprises acrylic, styrene, butadiene, EVA and/or VAE materials.

16. The adhesive of claim 13, wherein the metal is selected from the group consisting of cobalt, calcium zirconium and manganese.

17. The adhesive of claim 1, comprising an effective amount of electro-conductive material to render the cured adhesive electrically conductive.

18. The adhesive of claim 1, wherein the adhesive is formulated to substantially lack VOCs that are emitted during curing.

19. The adhesive of claim 1, wherein the oil component makes up about 1–20% of the composition.

20. The adhesive of claim 1, wherein the hydrocarbon resin component comprises resins with 6 or fewer carbon atoms, at a ratio to the oil component of about 2:1 to 1:2.

21. The adhesive of claim 1, wherein the adhesive has a formulation to cure to have a shear strength of over 5 psi after 15 minutes.

22. The adhesive of claim 1, wherein the adhesive has a formulation to cure to have a shear strength of over 200 psi after 3 months.

23. The adhesive of claim 1, wherein the adhesive has a formulation to exhibit an open time of up to 60 minutes.

24. The adhesive of claim 1, wherein the cross-linking agent comprises a pendant oxazoline group component.

25. The adhesive of claim 1, wherein the oil component is a drying oil.

26. The adhesive composition of claim 1, wherein the oil component is present in the amount about1 to about 20%.

27. The adhesive composition of claim 1, wherein the oil component is present in the amount about 4 to about 10%.

28. The adhesive composition of claim 2, wherein the C-5 resin is present in the amount about 4 to about 10%.

29. The adhesive composition of claim 2, wherein the C-9 resin is present in the amount about 10 to about 20%.

30. The adhesive composition of claim 1, wherein the fugitive alkali agent component is present in the amount about 0.1 to about 1.0%.

31. The adhesive composition of claim 1, wherein the fugitive anti-oxidant component is present in the amount about 0.1 to about 1.0%.

32. The adhesive composition of claim 1, wherein the cross-linking agent is present in the amount about 1.0 to about 7.0%.

33. The adhesive composition of claim 1, comprising about 1–20% oil component, about 14–30% hydrocarbon resin component, about 0.1–1.0% fugitive alkali agent component, about 0.1–1.0% fugitive anti-oxidant component and about 1–7% cross-linking agent.

34. The adhesive composition of claim 33, wherein the composition comprises about 4–10% C-5 resin and about 10–20% C9 resin.

* * * * *